United States Patent [19]

Mikol

[11] Patent Number: 5,211,204

[45] Date of Patent: May 18, 1993

[54] TOILET TANK BALLCOCK WITH DETENT ARM

[75] Inventor: Erwin F. Mikol, Park Ridge, Ill.

[73] Assignee: Moen Incorporated, Elyria, Ohio

[21] Appl. No.: 715,424

[22] Filed: Jun. 14, 1991

[51] Int. Cl.⁵ .................... F16K 31/24; F16K 33/00
[52] U.S. Cl. .......................... 137/410; 4/415; 137/426; 137/432; 137/441
[58] Field of Search ................ 4/324, 366, 381, 384, 4/415; 137/410, 420, 421, 426, 430, 433, 436, 437, 441, 444, 432

[56] References Cited

U.S. PATENT DOCUMENTS

| | | | |
|---|---|---|---|
| 2,827,915 | 3/1958 | Mitchell | 137/421 |
| 4,094,327 | 6/1978 | Brandelli | 137/426 |
| 4,182,364 | 1/1980 | Gilbert et al. | 137/426 |
| 4,340,082 | 7/1982 | Straus | 137/426 |
| 4,573,495 | 3/1986 | Rothe et al. | 137/414 |
| 4,651,359 | 3/1987 | Battle | 4/415 |
| 4,748,699 | 6/1988 | Stevens | 4/415 |
| 4,843,657 | 7/1989 | Orr | 137/410 |
| 4,945,581 | 8/1990 | Harris | 4/415 |
| 4,965,891 | 10/1990 | Antunez | 137/410 |

*Primary Examiner*—George L. Walton
*Attorney, Agent, or Firm*—Kinzer, Plyer, Dorn, McEachran & Jambor

[57] ABSTRACT

A toilet tank ballcock which includes an adjustable detent arm pivotally mounted above the ballcock float to swing into a latching position below the float and thereby prevent the float from lowering except pursuant to an intentional flush of the tank. The ballcock also has a fully and conveniently adjustable riser column and float linkage rod to allow for easy control of the volume of water delivered by each flush.

13 Claims, 1 Drawing Sheet

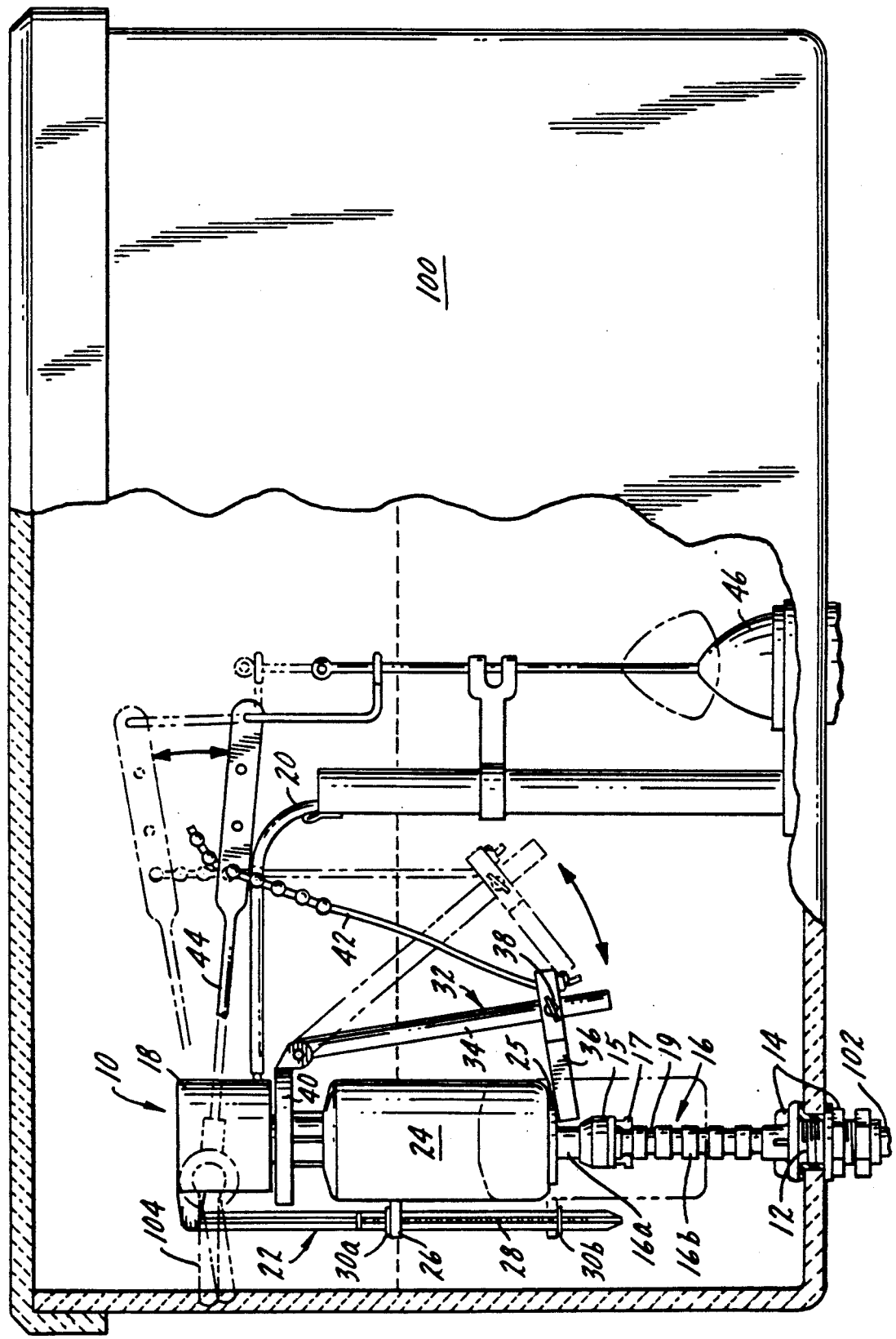

TOILET TANK BALLCOCK WITH DETENT ARM

The present invention relates to an improved toilet tank ballcock which both prevents the ballcock water valve from refilling the tank unless the toilet is intentionally flushed and provides for convenient control of the volume of water which is delivered by each flush. The ballcock is readily adjustable, simple, and highly reliable.

BACKGROUND OF THE PRESENT INVENTION

Toilets use a substantial amount of water in their operation and it is naturally desirable to avoid waste of any water if possible. This is especially true for commercial users having large numbers of toilets, such as hotels and motels, and those living in areas where water is in short supply.

One common source of wasted water relates to the volume of water delivered by each flush of the tank. For many users it is not necessary to have their tank deliver the maximum amount of water during each flush cycle, and a substantial amount of water can be conserved by reducing this volume. Hence, it is desirable to be able to conveniently control the volume of water a tank will deliver when flushed. Moreover, in some areas water shortages are only temporary, in which case a user may wish to conserve water only during a shortage period and return to normal flush volume after the shortage is over. In such situations, the convenience with which water volume can be adjusted is especially important.

Leaks are another potentially significant source of wasted water. Leaks often develop around the edges of the flush tank stopper valve as the stopper gets old and begins to deteriorate. With these leaks water drains slowing into the toilet bowl and can go undetected for a long period of time. Leaks also may develop at the base of the ballcock water supply line or through cracks in the tank, in which case water drains to the floor around the toilet causing potentially serious damage.

With a typical ballcock system, when water level in the tank falls below a certain level due to leakage, the ballcock simply activates water flow and refills the tank. Thus, because the tank is being perpetually refilled, leaking can continue indefinitely. Over time, a huge amount of water can be wasted or, worse, very extensive damage caused. There is a particularly great risk that such leaks will go undetected in situations, as in hotels and motels, where a toilet may not be used for substantial periods of time.

SUMMARY OF THE INVENTION

The present invention, among other things, reliably prevents a toilet tank from being refilled with water except after an intentional flush cycle, and provides for accurate and convenient control of the volume of water delivered by flushing the tank. These functions are accomplished by an improved toilet tank ballcock having a conveniently adjustable detent arm mounted above the ballcock float, and having a riser column and a water control valve linkage rod which are also fully and conveniently adjustable.

The detent arm is pivotally attached by one end above the ballcock float such that a catch member mounted near the lower end of the arm can swing down beneath the bottom of the float into a "latching" position. The detent arm is preferably biased into the latching position. In the preferred embodiment the detent arm is biased into the latching position under its own weight due to gravity, and the catch member of the detent arm will engage the ballcock float and prevent the ballcock float from descending. The catch member can be moved up or down on the detent arm and set at a desired location.

When the toilet tank is intentionally flushed the detent arm is swung and the catch member is moved out of the latching position, away from the float, so that the float will not be prevented from descending by the detent arm catch member. If, however, tank water level drops for some reason other than an intentional flush, such as a leak, the detent arm will remain in its latching position and the catch member will prevent the float from descending and thereby prevent the ballcock water valve from being opened to refill the tank.

Having the detent arm pivotally mounted above the ballcock float, rather than below, allows for more convenient and accurate setting of the proper position of the catch member on the detent arm because the detent arm can be easily swing up and out of the water in order to manipulate the catch member adjustments. Thus, to obtain the proper setting of the catch member on the detent arm, the user can simply swing the detent arm clear of the float, allow the tank to fill to its normal upper level, and then conveniently adjust the catch member on the detent arm so that the catch member barely clears the bottom of the float.

Such proper length adjustment of the detent arm ca be crucial to it performing its intended leak limiting function. If the detent arm is improperly set so that it rests too far below the float, it may be ineffective because the float may be able to descend far enough before being caught by the detent arm to turn the water control valve on. If the detent arm is adjusted too high, the catch member will not clear the edge of the float in order to swing into the latching position with the catch member beneath the float when the tank is filled.

With prior art designs where a float catch mechanism is mounted below the float, such as disclosed by Orr (U.S. Pat. No. 4,843,657), adjustments are both less convenient and less accurate. If the user makes adjustments while the tank is filled with water, it will be necessary to work beneath the water line. Besides being rather cold and awkward, the submerged portions of the user's hands and forearms will displace a certain amount of water and therefore change the tank water level, which will raise the float slightly (if the float is not obstructed from ascending further) and make accurate adjustment of the retaining mechanism less likely. If the user makes adjustments while the tank drained, this still would be more difficult because the user would have to manipulate both the float and retaining mechanism simultaneously. Moreover, such an empty tank adjustment would seem to be inherently less accurate because the float would not be floating precisely at is actual operating level.

Furthermore, having the detent arm mounted above the ballcock float allows the ballcock to have a fully adjustable riser column, which is another important feature of the present invention. An adjustable riser column allows for an overall height adjustment of the ballcock, which determines (along with other features discussed below) the level to which water in the tank must rise before the ballcock will shut off the water from refilling the tank. Since most of the water in a tank is typically drained during each flush, and the height of the water in the tank is directly related to the volume of water in the tank, the water level to which a tank fills is one determinant of the volume delivered by each flush. Thus, the riser column can be extended to increase, or lowered to decrease, the amount of water delivered with each tank flush.

Besides controlling flush volume, it is also important to have an adjustable riser column so that the ballcock ca be adapted to fit properly into different size toilet tanks.

The riser column is made adjustable by having two concentric tubes slidable relative to each other. The inner tube connects to the water supply at its base. The outer tube slides up or down over the inner tube to adjust the height of the ballcock. Prior art float retaining mechanisms, such as in Orr, limit such an arrangement because they attach to the riser column below the float. The height of the riser column, therefore, must be set greater than the height of the float retaining mechanism. No such limitation exists with a detent arm mounted above the float.

Moreover, the inner tube has a number of annular grooves along it into which press a set of retaining members extending from the basal edge of the outer tube. The retaining members are resilient and so can be dislodged when enough pressure is applied. This allows the riser column to be pulled and pushed straight up and down without twisting the ballcock around in a screw-like manner. Hence, quick and convenient changes in height can be made without disconnecting the various lines which may be attached from the ballcock to other apparatus in the tank (i.e., the water fill tube and detent lifting cord). Furthermore, when the height of the riser column is used to control water level, the detent arm does not need to be reset every time water level is changed. This is a significant advantage over designs where the float retaining mechanism must be readjusted after each such change in operating water level.

Another means for controlling the water level to which the tank fills is provided by an adjustable water control linkage rod. This rod links the ballcock float to the water control valve so that when the float rises, the water is shut off, and when the float lowers, water flow is turned on. Such an adjustable linkage rod provides an alternate way of adjusting flush volume and is particularly necessary where a user wishes to change the water level without changing the overall ballcock height Also, since the increments of adjustment on the linkage rod are finer than on the riser column, it allows for more precise water level control.

Furthermore, the linkage rod can be set so that the on and water levels are substantially separated from each other. In other words, so that the water level must drop a predetermined distance before the water control valve is turned on to begin refilling the tank. This contrasts with many ballcock designs wherein the distance that the water level must drop in order to activate refilling is not adjustable and is usually relatively small. Such adjustability provides at least two benefits.

First, it provides an added degree of control over the water volume delivered by a flush. For example, if the linkage rod is adjusted to begin refilling almost immediately after the water level begins to drop, water will be added simultaneously while the tank is draining—thereby increasing the total water volume delivered per flush. On the other hand, if the linkage rod is adjusted to begin refilling only after the water level has dropped to near the bottom of the tank, then there will be very little addition of water to the tank during the flush--thereby reducing total flush volume.

Second, and more importantly, the adjustable linkage rod allows for much more reliable and convenient functioning of the detent mechanism. As described earlier, the detent arm swings down from above the ballcock float and rests in a latching position beneath the float to prevent it from lowering unless the tank is intentionally flushed. However, there will inevitably be some space between the bottom of the float and the catch plate, and this space must be small enough in order to prevent the float from descending too far (so as to turn the water control valve on) before being caught by the detent arm. Consequently, accurate positioning of the detent arm is critical to its operation.

However, when the linkage rod is adjusted so that the water on and off levels are significantly apart from each other, there is a much larger range where the detent arm will still operate properly. Thus, instead of having to be set so that the latching position is just barely beneath the float, the detent arm can be set at any point below the float so long as the float would be caught before reaching the level where water flow would be turned on. Hence, the float catching mechanism (in this case a detent arm) both operates more reliably and is less dependent upon accurate setting.

Some features of the preferred embodiment of the present invention, such as a ballcock having an adjustable linkage rod with separable water on and off positions, are shown in Rothe et al. (U.S. Pat. No. 4,573,495), which is hereby incorporated by reference. However, Rothe does not disclose a ballcock wi arm or other float catching mechanism, and does not suggest the benefits of using its linkage mechanism and water control valve with a leak limiting float retaining mechanism.

DESCRIPTION OF THE DRAWINGS

In order that the invention may be more readily understood, reference is made to the accompanying drawing in which:

THE FIGURE partially cut away side view of a toilet tank incorporating a ballcock with detent according to the present invention.

DETAILED DESCRIPTION OF THE PRESENT INVENTION

A ballcock valve according to a preferred embodiment of the present invention is shown in FIG. 1, generally indicated by 10, installed in a toilet tank 100.

Ballcock 10 has a threaded base portion 12 which is secured through an opening in tank 100 by a pair of mounting nuts 14. A water supply line 102 is connected to the bottom of ballcock 10. Water from supply line 102 passes through a riser column 16 and up to a water control valve 19 located beneath cap 18. The water control valve regulates the flow of water passing through the ballcock 10 and out through a fill tube 20 into tank 100.

A linkage rod 22 is connected to the water control valve such that lifting linkage rod 22 upward to a selected upper position closes the water control valve to shut off the water flow, and pulling linkage rod 22 down to a selected lower position opens the water control valve to allow the flow of water. A float 24 is movable vertically up and down along the axis of riser column 16 and has a tab member 26 through which linkage rod 22 passes. Linkage rod 22 is cross-shaped in cross section and has a plurality of notches along its outer edges which form, in effect, annular grooves 28. Into these annular grooves 28 fit upper and lower O-rings 30a, 30b which are sized so as to engage float tab member 26, rather than passing through it. Hence, when float 24 moves up to a certain level it engages linkage rod 22 and lifts it to turn water off; when float 24 moves down to a certain level it engages lower O-ring 30b and turns water flow on.

The height of ballcock 10 can be adjusted by sliding the outer riser column tube 16a relative to the inner riser column tube 16b. The outer tube 16a has four resilient retaining members 17 (only two shown) which press radially inward and are received by one of a plurality of annular grooves 19 located along inner riser tube 16b. Since the retaining members are resilient, they allow the outer and inner tubes 16a, 16b to be slid relative to each other when a sufficient force is applied. However, when a desired height of the ballcock 10 is selected, a lock collar 15 can be slid down around the retaining members 17 to prevent them from being dislodged from their groove 19.

Also according to the present invention, ballcock valve 10 includes a detent arm 32, which has a shaft 34 and a catch member 36. Shaft 34 fits through a hole in catch member 36 so that catch member 36 can be moved along shaft 34 to adjust the effective length of the detent arm 32. Catch member 36 is locked into place on shaft 34 by tightening a set screw 38. The upper end of shaft 34 is pivotally attached to a lip member 40, fixed near the top of the riser column 16, such that detent arm 32 can swing freely in an arc.

The detent arm is biased to urge catch member 36 to engage float 24 in a latching position wherein catch member 36 prevents float 24 from descending to the position which opens the water control valve 19. In the preferred embodiment, catch member 36 is biased by gravity. Also in the preferred embodiment, the upper surface of catch member 36 is roughened or scored to enhance friction, and float 24 has a hard plastic base ring 25 fixed to its bottom surface. The roughened surface of catch member 36 in conjunction with base ring 25 helps prevent detent arm 32 from slipping out from under float 24 when it is needed to hold the float 24 from falling. A rubber chord 42 ties detent arm 32 to a flush lever 44 and adjusted so that when flush lever 44 is raised, detent arm 32 is swung clear of float 24.

During a normal flush cycle, the exterior flush handle 104 is manually turned and thereby lifts flush lever 44. As flush lever 44 rises, it lifts the flush valve stopper 46 to flush the tank and simultaneously swings detent arm 32 out of the latching position and away from float 24, as shown by dashed lines. As the tank drains and water level lowers, float 24 also descends. When float 24 gets low enough so that tab 26 engages the lower O-ring 30b, linkage rod 22 is pulled downward thereby opening the water control valve 19 located under cap 18 and allowing water to flow into tank 100 via fill tube 20.

After it has emptied and stopper 46 is back in place, tank 100 then refills until float 24 rises sufficiently to where tab 26 engages upper O-ring 30a and lifts linkage rod 22 to shut the water off, thereby establishing the upper operating level. Also, as float 24 rises sufficiently to clear catch member 36, the detent arm 32 swings due to gravity from its own weight back into a latching position underneath float 24.

If however, for some reason water level in the tank decreases without intentionally flushing the tank, such as due to a leak, detent arm 32 will not have been lifted out of the way and float 24 will be prevented from descending by catch member 36. Therefore, tab 26 will not engage the lower O-ring 30b and linkage rod 22 will not be pulled down to commence water flow. Preferably, catch member 36 is adjusted so that it will catch float 24 approximately one quarter of an inch before reaching lower O-ring 30b.

Adjustment of the detent arm 32 is conveniently accomplished with the present invention by simply holding detent arm 32 swung up away from the float 24 and allowing the tank to fill to its normal level. Then, set screw 38 is loosened, catch member 36 is moved to a selected position, and detent arm 32 is released to swing toward float 24. If catch member 36 swings into the proper latching position beneath float 24, detent arm 32 is swung back out of the water and set screw 38 is tightened; if not, the procedure is repeated until a proper setting is obtained. Thus, it can be seen that accurate positioning of the detent arm 32 is both simple and convenient, and can be accomplished while the user's hands are predominantly out of the water.

If a user wishes the change the volume of water delivered by flushing tank 100, either the overall height of the ballcock 10 can be changed or the position of rubber O-rings 30a, 30b can be shifted.

To change the height of ballcock 10, lock collar 15 is lifted up from around retaining members 17 and outer riser tube 16a is slid relative to inner tube 16b. There will be no need to readjust detent arm 32 because it will still occupy the same position relative to float 24 and the linkage rod 22. Moreover, fill tube 20 and chord 42 need not be disconnected, although the length of chord 42 may need to be readjusted.

The opening water level can also be changed by simply moving the upper O-ring 30a to a different groove 28. This will change the water level at which O-ring 30a is engaged by float tab 26. However, when this method is used detent arm 32 must be reset.

In an alternative embodiment, the swinging detent arm of the present invention may be retrofitted to other styles of ballcock which may or may not possess all of the other features of the preferred embodiment of the present invention. The detent arm of the present invention may be biased into the latching position by a spring or said other device as may replace or supplement the force of gravity.

From the foregoing, it can be seen that a toilet tank ballcock with detent arm for preventing the ballcock water valve from opening to fill a toilet tank unless the tank is intentionally flushed has been provided which fully meets the objects of the instant invention. While the device has been described in the terms of a preferred embodiment, there is no intent to limit the invention to the same. On the contrary, it is intended to cover all modifications and equivalents within the scope of the appended claims.

What is claimed is:

1. In a toilet tank including a flush handle, flush lever, flush valve, and water supply, an improved toilet tank ballcock comprising:

a vertical riser column communicating with said water supply;

a water control valve regulating the flow of water from said water supply into said toilet tank;

a float disposed about said riser column and coupled to said water control valve such that downward movement of the float to a selected lower level opens the water control valve to fill the toilet tank and upward movement of the float to a selected upper level closes the water control valve to stop filling the tank;

a detent arm including a shaft member and a catch member, said shaft member having first and second ends, said catch member being adustably slidably affixed to said shaft member, said first end of said shaft being pivotally attached to said ballcock at a point above said float, said second end of said shaft member being pivotable in an arc about said first end such that said second end and said catch member can be swung up and out of the water to facilitate access to said slidable catch member when the water is at said upper level for adjustment of said catch member, and said catch member being positioned on said shaft member such that when said float is at said upper level the catch member is biased into a latching position to engage said float and prevent said float from descending to said lower level, the adjustment of said catch member providing latching of said float at different water levels;

connecting means for trying said detent arm to said flush lever such that when said flush lever is raised to open the toilet tank flush valve said detent arm is swung out of said latching position to allow said float to descend.

2. The ballcock device of claim 1, wherein the catch member is biased into the latching position by the force of gravity.

3. The ballcock device of claim 1, wherein said catch member extends beneath the bottom edge of said float to assume said latching position.

4. The ballcock device of claim 1, wherein said detent shaft member is a substantially round rod and said catch member is a flat plate.

5. The ballcock device of claim 1, wherein said riser column includes inner and outer concentric tubes which can be slid relative to each other for adjusting the length of said riser column.

6. The ballcock device of claim 5, wherein said inner tube includes a plurality of annular grooves and said outer tube includes a plurality of resilient retaining members along its lower edge projecting downward and biased radially inward against said inner tube, said retaining members adapted to engage the annular grooves of said inner tube.

7. The ballcock device of claim 1, wherein said float is coupled to said water control valve by a linkage rod including a plurality of annular grooves and upper and lower O-rings adapted to fit into said grooves.

8. A toilet tank ballcock including a vertical riser column, a water control valve for regulating the flow of water into a toilet tank, a float disposed about said riser column coupled to said water control valve such that downward movement of the float to a selected lower position opens the water control valve and upward movement of the float to a selected upper position shuts the water control valve off, the improvement comprising:

a detent arm of adjustable length pivoted from a point above said float and engageable to said float at a point below said float so as to prevent it from lowering to a position that would initiate water flow, said arm being adjustable at a location adjacent the lower end of the float to latch the float at different water levels, said arm being pivotal to a position above the water level to provide for adjustment thereof above the water level.

9. The ballcock device of claim 8, wherein said detent arm includes a shaft member having first and second ends, said first end being pivotally attached to a point above said float, and a catch member mounted to said shaft member, said catch member being biased into a latching position wherein said catch member prevents said float from descending below said lower position.

10. The ballcock device of claim 8, wherein said riser column includes inner and outer concentric tubes which can be adjusted axially relative to each other in order to change the height of the ballcock.

11. In a toilet tank having a flush handle, flush lever, flush valve, and water supply, an improved ballcock which allows convenient control of the volume of water delivered by flushing the tank and prevents the tank from being refilled with water except pursuant to an intentional flush, comprising, in combination:

a vertical riser column communicating with said water supply and including inner and outer concentric tubes which can be axially slid relative to each other for adjusting the length of said riser column;

a float disposed about said riser column and vertically movable up and down along the axis of the riser column;

a water control valve for regulating the flow of water from said water supply into said toilet tank;

a linkage rod coupling said float to said water control valve such that downward movement of said float to a particular level opens said water control valve, thereby allowing water to flow into said tank, and upward movement of said float to a particular level closes said water control valve, thereby preventing water from flowing into said tank, said linkage rod including means to adjust the relative levels at which said float turns water flow off and on respectively;

a detent arm of adjustable length pivoted from a point above said float and engageable to said float at a point below said float so as to prevent it from lowering to a position that would initiate water flow, said arm being adjustable at a location adjacent the lower end of the float to latch the float at different water levels, said arm being pivotal to a position above the water level to provide for adjustment thereof above the water level;

means for coupling said detent arm to said flush lever such that when said flush lever is raised to open said toilet tank flush valve said detent arm is move out of said latching position.

12. A toilet tank ballcock including a vertical riser column, a water control valve for regulating the flow of water into a toilet tank, a float disposed about said riser column coupled to said water control valve such that downward movement of the float to a selected lower level opens the water control valve and upward movement of the float to a selected upper level shuts the water control valve off, the improvement comprising:

a detent arm of adjustable length pivoted from a point above said float and engageable to said float at a point below said float so as to prevent it from lowering to a position that would initiate water flow, said arm being adjustable at a location adjacent the lower end of the float to latch the float at different water levels, said arm being pivotal to a position above the water level to provide for adjustment thereof above the water level to achieve said different water levels; and wherein said float is coupled to said water control valve by an adjustable coupling such that said selected upper and lower levels are selectively adjustable relative to each other.

13. The ballcock device of claim 12, wherein said adjustable coupling includes a linkage rod having a plurality of annular grooves and upper and lower O-rings adapted to fit partially into said annular grooves, said upper O-ring being engaged by said float to lift said linkage rod and shut water flow off when said float rises to said selected upper level, said lower O-ring being engaged by said float to pull said linkage rod down and commence water flow when said float descends to said selected lower level, and said O-rings being positionable into selected said annular grooves to thereby determine said selected upper and lower levels.

* * * * *